March 8, 1966  C. D. WATTS  3,238,775
HEAT FLUX RESPONSIVE DEVICE
Filed Jan. 2, 1962
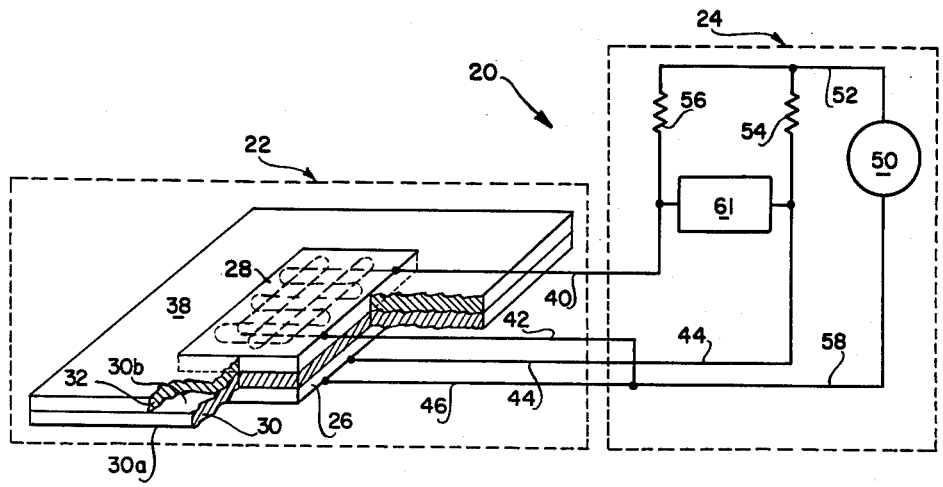
FIG_1
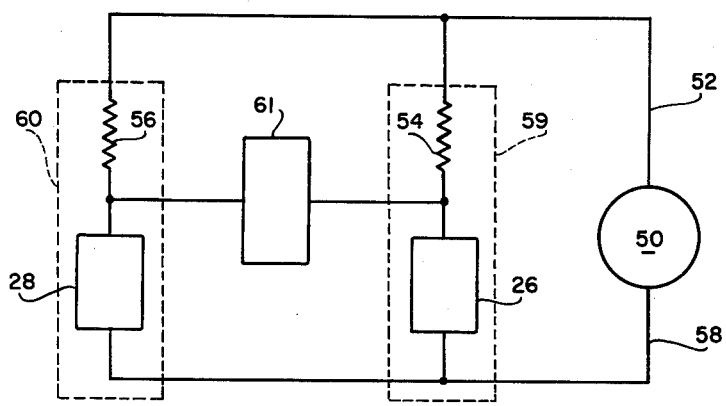
FIG_2
INVENTOR.
CALVIN D. WATTS
BY
*George C. Sullivan*
Agent United States Patent Office 3,238,775
Patented Mar. 8, 1966

3,238,775
HEAT FLUX RESPONSIVE DEVICE
Calvin D. Watts, Orlando, Fla., assignor to Lockheed Aircraft Corporation, Burbank, Calif.
Filed Jan. 2, 1962, Ser. No. 163,661
1 Claim. (Cl. 73—190)

This invention relates to a heat flux measuring instrument, and more particularly to a fast response heat flux measuring transducer particularly adapted to measure heat flux over a wide heat flux range and wide temperature range.

Experience in attempted measurement of the heat flux of brazed stainless steel honeycomb panels has revealed the need for a fast response, light weight, heat flux measuring device which may be used in the field as well as in the laboratory and which has a fast response time, a wide heat flux operating range, and a wide operating temperature range.

Known prior art heat flux measuring instruments or devices small enough for use in field applications are limited to an approximate maximum operating temperature in the order of 250° F. Such devices have the further limitation that they must be used on smooth planar surfaces for the achievement of maximum accuracy. Other conventional heat flux measuring instruments or devices such as the guarded hot box and the guarded hot plate are generally limited to laboratory applications because of being relatively heavy, bulky, and requiring a delicate balancing of temperatures further resulting in an extremely long, time-consuming period in the order of several hours for reaching thermal equilibrium. Such difficulties and undesirable attributes of the prior art instruments and devices are eliminated through use of this invention.

Accordingly, it is an object of this invention to provide a fast, yet accurate, heat flux responsive device.

Another object of this invention is to provide a heat flux responsive device providing accurate measurements over a wide heat flux range.

A further object of this invention is to provide a heat flux responsive device capable of accurately measuring heat flux over a wide operating temperature range, including substantially higher temperatures than those heretofore attained.

Still another object of this invention is to provide a simple, relatively inexpensive heat flux responsive device for field or laboratory applications.

A further object of this invention is to provide a light weight, compact, and structurally flexible heat flux transducer to accurately measure heat flux over wide flux and temperature ranges in both the laboratory and in the field.

Other objects and advantages will become apparent when taken in connection with the accompanying drawing in which:

FIGURE 1 is a schematic drawing of one embodiment of a heat flux transducer of this invention; and FIGURE 2 is a schematic wiring diagram of the heat flux transducer embodiment shown in FIGURE 1.

The temperature drop across a given conductor is proportional to the heat flux through it. This phenomenon may be expressed by the formula $q = KC(T_1 - T_2)$: where $q$ = heat flux; $K$ = thermal conductivity of the conductor material; $C$ = constant related to the conductor configuration; $T_1$ = hotside temperature and $T_2$ = cold side temperature. The heat flux through a material having a known thermal conductivity can be determined from the above formula upon the application of heat at a known steady temperature to one side of the material coupled with measurement of the temperature drop across the material under known ambient temperature conditions. Calibration of such a device in terms of the temperature drop across it at different ambient temperature conditions under different applied steady heat conditions permits calibration charts for the conductor material to be drawn from this information. The device may then be used to measure the heat flux through other materials by placing it in juxtaposition with a material, the heat flux of which is to be measured and passing heat at a steady temperature through the material, the heat then passing through the measuring device. This invention is concerned with a transducer type device incorporated in a measuring instrument operating in accordance with the above principles.

Generally stated, the invention comprises a flexible light weight transducer for a heat flux measuring instrument, adapted to be disposed adjacent a test material whereby the heat flux through the material can be measured. The transducer has a pair of temperature responsive resistors separated by a relatively thin, flexible insulating wafer having low thermal conductivity interposed between the temperature responsive resistors. Indicating means connected electrically to the first and second temperature responsive resistors sense the difference in temperature across the insulating wafer upon the application of heat at a steady temperature to the test material, thus indicating the heat flux through the insulating wafer and hence through the test material.

More specifically, FIGURE 1 shows a heat flux measuring instrument 20 comprising a heat flux transducer 22 and an indicating or measuring circuit 24.

Heat flux transducer 22 comprises two temperature responsive resistors 26 and 28, a thin flexible inorganic insulator wafer 30 and an organic wafer guard 32 having substantially the same thickness as resistor 28. The resistor 26 is connected perferably by bonding to side 30a of insulator wafer 30 centrally of the wafer while resistor 28 is connected preferably by bonding to the other side 30b of insulator 30 in opposed relation to resistor 26. The inorganic wafer guard 32 is connected (also preferably by bonding) to face 30b of insulator wafer 30 in surrounding relation about resistor 28 to provide the heat flux transducer 22 with a planar surface 38 for presentment to the surface of the material, the heat flux of which is to be measured, the surface 38 comprising the combined surfaces of wafer guard 32 and resistor 28.

In the illustrated embodiment of the heat flux transducer 22 of this invention the resistors 26 and 28 are each of a single length of very small diameter platinum wire which is woven into a very thin grid. While platinum is indicated as the preferred material because of its desirable non-deteriorating electrical resistance properties, high thermal conductivity, stability over a wide operating temperature range, and structural flexibility, it is to be understood that any other material having appropriate properties may be utilized. For example, in some applications where high operating temperatures are not contemplated, the resistors could be made of some less expensive conductor such as nickel.

The wafer 30 is preferably a very thin sheet of synthetic mica having a low thermal conductivity. Synthetic mica or high grade natural mica was selected as the insulator wafer material because it is dimensionally and chemically stable over a wide operating temperature range and has a low thermal conductivity permitting the use of a very thin, therefore flexible, wafer which still has a measurable temperature drop across it. The insulator wafer, in that it is thin, has the further advantage that there are negligible heat losses from the edges of the wafer. Likewise, the inorganic wafer guard 32 is preferably a very thin sheet of synthetic mica.

The temperature responsive means or resistors 26 and 28 of transducer 22 are connected by leads 44, 46 and 40, 42, respectively to measuring circuit 24. Measuring circuit 24 comprises a constant source 50 of D.C. voltage. Source 50 is connected by lead 52 to one end of each of resistors 54 and 56 and by lead 58 to each of leads 42 and 46, which in turn are connected to resistors 28 and 26, respectively. Leads 44 and 40 of resistors 26 and 28 are connected to the other ends of resistors 54 and 56, respectively. As best seen in FIGURE 2, the temperature responsive resistor 26 is in series with resistor 54 in a circuit portion 59, the temperature responsive resistor 28 is in series with resistor 56 in a circuit portion 60, and these circuit portions are parallel connected by leads 52 and 58 to the source 50 of D.C. voltage. The series circuits 59 and 60 form the arms of a balanced bridge circuit and a potentiometer 61 is connected between the arms of the bridge circuit to measure a difference in potential therebetween.

Measuring circuit 24 is designed so that the current flowing through circuit portions 59 and 60 will be balanced when resistors 26 and 28 are at the same temperature. However, if the temperature of resistor 28 is increased relative to that of resistor 26, for example, then resistor 28 senses this increased temperature, its resistance is increased proportionately to the sensed temperature increase and less current will flow in circuit portion 60 than in circuit portion 59. Such a difference in current flow in the circuit portions is indicated by the potentiometer 61 in millivolts. Since the millivolt indication is directly proportional to the difference in temperature $T_1-T_2$, $T_1$ being the temperature of resistor 28 and $T_2$ being the temperature of resistor 26, and since this temperature difference is directly proportional to the heat flux "$q$" through the insulator wafer 30 according to the mathematical relationship $$q=KC(T_1-T_2)$$

then the millivolt indication on the potentiometer 61 may be read in heat flux units if the potentionmeter dial is calibrated or by referring to calibration curves.

The potentiometer can be calibrated to read heat flux directly under various ambient temperature conditions by positioning the surface 38 of the heat flux transducer firmly against a calibration heater, exciting the heater to known heat flux levels, recording the transducer temperature and recording the potentiometer indication to the nearest 0.01 millivolt. The transducer temperature varies as a direct function of the operating temperature of the heat source. Therefore, its temperature, being easily accurately obtainable, is used in lieu of the operating temperature of the heat source, which is hard to accurately obtain. A suitable calibrating device is known in the art as the "infinite plane heater" which is more particularly described in an article by N. E. Hager, Jr., entitled "Thin Heater Thermal Conductivity," published in the Review of Scientific Instruments, volume 31, Number 2, pp. 177–185, February 1960.

In operation, the surface 38 of heat flux transducer 22 is placed firmly against the surface of the material, the heat flux of which is to be measured. The heat flux transducer, being relatively thin and having structurally flexible component parts, may be used on curved surfaces without loss of accuracy. The temperature of or heat flux from the confronting surface of the material can then be obtained by reading the potentiometer indication which has been calibrated for temperature readings as discussed above.

A typical heat flux responsive device of this invention was constructed using commercially available thin platinum grid resistors 26 and 28, a thin synthetic mica insulator wafer 30, a thin synthetic mica guard wafer 32 and a balanced bridge indicating circuit. Tests made using this heat flux responsive device disclosed that it is extremely fast, requiring only approximately 30 seconds to achieve a 92% steady state condition once the heat flux through the test material reaches a steady state, thereby making it extremely well suited for field applications. This is an improvement in response time over the guarded hot plate, for example, of several orders of magnitude.

The tests further disclosed that the device could withstand heat over the extremely wide transducer temperature range from zero to 1,060° Fahrenheit, with no deterioration of the transducer circuit. Additionally, the sensitivity of the device was found to be quite good over the wide heat flux range from 100 to 4,300 B.t.u. per hour per square foot per millivolt.

While a particular embodiment of the invention has been illustrated and described, it will be obvious to those skilled in the art that various changes and modifications may be made without departing from the invention and it is intended to cover in the appended claim all such modifications and equivalents as fall within the true spirit and scope of this invention.

What is claimed is:

A heat flux measuring instrument comprising:
a heat flux transducer including a thin and flexible insulative wafer;
first and second lengths of platinum wire configured to form separate temperature responsive resistance elements;
said resistance elements being secured in thermally conductive relationship to opposite sides of said insulative wafer centrally thereof;
a wafer guard secured to one of said opposite sides of said wafer;
said wafer guard having a thickness substantially the same as the thickness of the resistance element secured to said one side of said insulative wafer, said wafer guard having overall dimensions substantially the same as the overall dimension of said insulative wafer and having a centrally disposed opening;
said opening being dimensioned to receive said resistance element when said wafer guard is secured to said insulative wafer;
an indicating means including resistor means connected in series circuit with each of said resistance elements;
said series circuits each being connected to a common source of D.C. voltage; and
potential measuring means connected across said series circuits to indicate a difference in temperature between said resistance elements upon the application of heat to one side of said heat flux transducer.

References Cited by the Examiner

UNITED STATES PATENTS

| 1,528,383 | 3/1925 | Schmidt | 73—341 |
| 2,395,192 | 2/1946 | Ostergren | 73—342 |
| 2,769,334 | 11/1956 | Soehngen | 73—15 |
| 3,075,377 | 1/1963 | Lang | 73—15 |

FOREIGN PATENTS

| 442,294 | 3/1927 | Germany. |

OTHER REFERENCES

Periodical, Review of Scientific Instruments, article entitled "Steady-State Heat Flux Gauge," by Brown et al., pages 984 and 985 of August 1961 issue.

RICHARD C. QUEISSER, *Primary Examiner.*

JOHN P. BEAUCHAMP, *Examiner.*